(12) United States Patent
Marupaduga

(10) Patent No.: US 11,532,880 B1
(45) Date of Patent: Dec. 20, 2022

(54) BACK LOBE ANTENNA GAIN TO DETERMINE ANTENNA ELEMENTS IN MIMO SECTORS

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 144 days.

(21) Appl. No.: 17/136,605

(22) Filed: Dec. 29, 2020

(51) Int. Cl.
| | |
|---|---|
| H01Q 3/26 | (2006.01) |
| H01Q 3/24 | (2006.01) |
| H04B 17/29 | (2015.01) |
| H04B 7/08 | (2006.01) |
| H04B 7/0413 | (2017.01) |
| H04B 7/06 | (2006.01) |

(52) U.S. Cl.
CPC ............. *H01Q 3/2617* (2013.01); *H01Q 3/24* (2013.01); *H04B 7/0413* (2013.01); *H04B 7/061* (2013.01); *H04B 7/084* (2013.01); *H04B 17/29* (2015.01)

(58) Field of Classification Search
CPC ...... H04B 7/0413; H04B 7/061; H04B 7/084; H04B 17/29; H01Q 3/24; H01Q 3/2614
See application file for complete search history.

(56) References Cited

U.S. PATENT DOCUMENTS

| | | | | |
|---|---|---|---|---|
| 2013/0190000 | A1* | 7/2013 | Boudreau | H04W 74/004 455/449 |
| 2016/0270087 | A1* | 9/2016 | Soriaga | H04B 7/0671 |
| 2022/0069878 | A1* | 3/2022 | Schuh | H04B 7/0413 |

* cited by examiner

*Primary Examiner* — David B Lugo

(57) ABSTRACT

Systems, methods, and computer-readable media herein dynamically adjust the number of elements active within a neighboring base station in order to reduce the back lobe overlap and thus reduce the interference caused by such an overlap. User devices assigned to communicate with an antenna array are monitored to determine if they are experiencing a decreased level of performance which may be caused by an overlapping back lobe from a neighboring cell site. If the user device's performance falls below a threshold value, the gain associated with the neighboring cell site is dynamically reduced in order to reduce the back lobe overlap.

20 Claims, 7 Drawing Sheets

BACK LOBE ANTENNA GAIN TO DETERMINE ANTENNA ELEMENTS IN MIMO SECTORS

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, systems, methods, and computer-readable media that employ user equipment location information, sector performance information, and information related to main lobe and back lobe antenna gain, which are dynamically adjusted to combat the negative impacts on user equipment in areas where multiple base stations' signals overlap.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
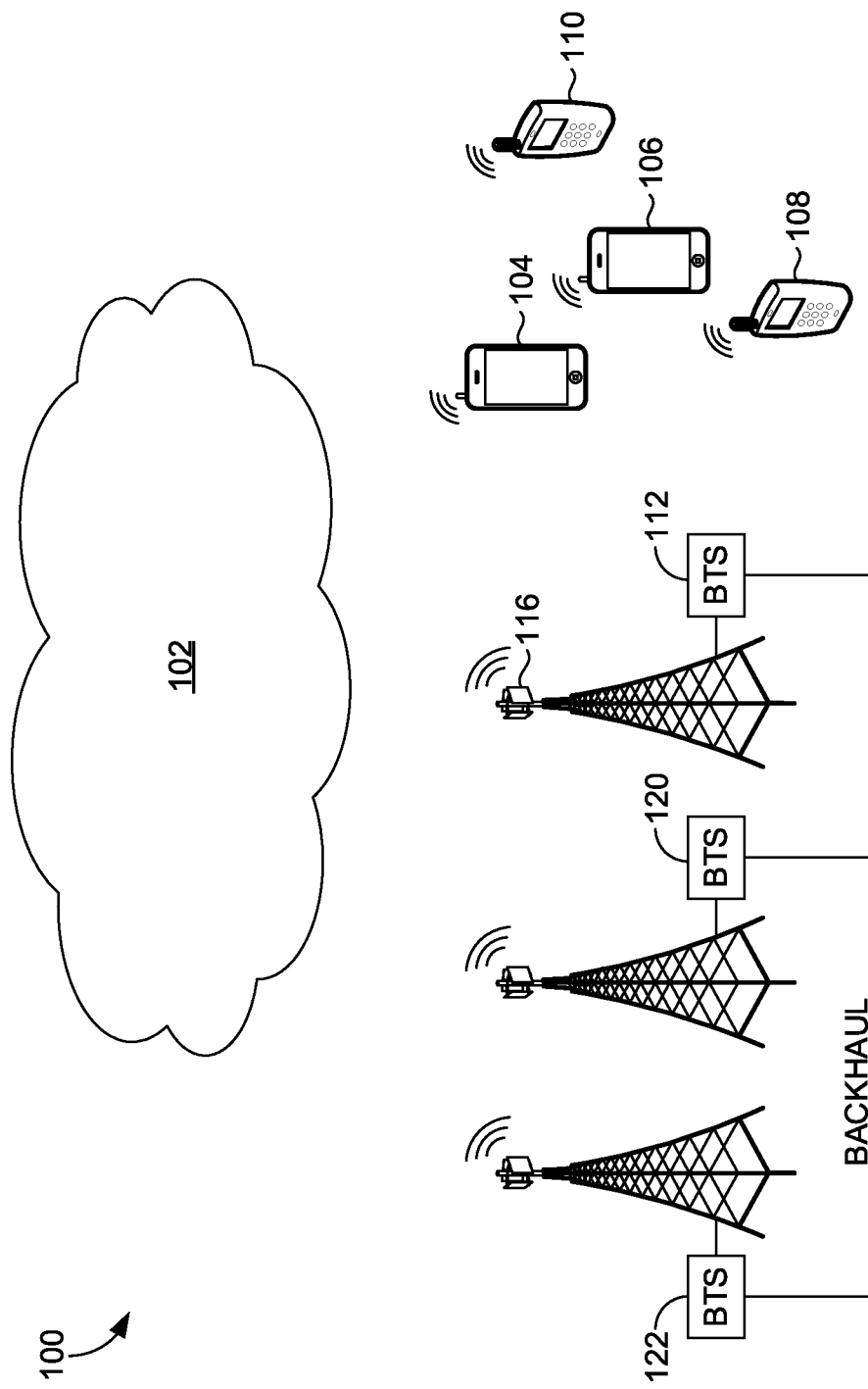
FIG. 1 depicts a schematic for an exemplary device, in accordance with an embodiment of the present invention.

The subject matter of select embodiments of the present invention is described with specificity herein to meet statutory requirements. The Detailed Description is not intended to define what is regarded as the invention, which is the purpose of the claims. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AWS Advanced Wireless Services
BRS Broadband Radio Service
BTS Base Transceiver Station
CDMA Code Division Multiple Access
EBS Educational Broadband Services
eNodeB Evolved Node B
EVDO Evolution-Data Optimized
gNodeB Next Generation Node B
GPS Global Positioning System
GSM Global System for Mobile Communications
HRPD High Rate Packet Data
eHRPD Enhanced High Rate Packet Data
LTE Long Term Evolution
LTE-A Long Term Evolution Advanced
PCS Broadband Personal Communications Service
RNC Radio Network Controller
SyncE Synchronous Ethernet
TDM Time-Division Multiplexing
VOIP Voice Over Internet Protocol
WAN Wide Area Network
WCS Wireless Communications Service
WiMAX Worldwide Interoperability for Microwave Access Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

At a high level, systems, methods, and computer-readable media of the present invention identify user devices that are negatively impacted by the overlap of a first base station's main lobe and a second base station's back lobe. The overlapping signals from the two base stations may cause a user device within the coverage are of the first base station's main lobe to experience degraded performance. This degraded performance of a user device is detected by the first base station and communicated to the second base station using a logical interface. Aspects herein employ this performance information to dynamically combat noise and interference at a first base station. By disabling antenna elements within the second base station's antenna, the back lobe gain is reduced, as well as the overlap between the two lobes. The reduction of overlap between the back lobe of the second base station and the main lobe of the first base station is thus reduced such that the performance experienced by the user device is improved.

In a first aspect of the present invention, a method is provided. The method comprises determining that a wireless user device is connected to a first base station antenna array's main lobe. The method further comprises determining that the user device is experiencing a degradation in performance and that there is an overlap between the first base station antenna array's main lobe and a second antenna array's back lobe. In embodiments, a communication is sent from the first base station to a second base station. This communication contains, among other things, instructions for the second base station to dynamically reduce the back lobe gain associated with the antenna array for the second base station.

In a second aspect of the present invention, computer-readable media is provided, the computer-readable media having computer-executable instructions embodied thereon that, when executed, perform a method. In accordance with the media, it is determined that a wireless user device is connected to a first base station antenna array's main lobe. The method further comprises determining that the user device is experiencing a degradation in performance and that there is an overlap between the first base station antenna array's main lobe and a second antenna array's back lobe. In embodiments, the method sends a communication from the first base station to a second base station. This communication contains, among other things, instructions for the second base station to dynamically reduce the back lobe gain associated with the antenna array for the second base station.

In a third aspect of the present invention, a system is provided. The system comprises determining that a wireless user device is connected to a first base station antenna array's main lobe. The method further comprises determining that the user device is experiencing a degradation in performance and that there is an overlap between the first base station antenna array's main lobe and a second antenna array's back lobe. In embodiments, the method sends a communication from the first base station to a second base station. This communication contains, among other things, information regarding the interference experienced due to the overlapping lobes. Instructions are then given such that the second base station dynamically reduces the back lobe gain associated with the antenna array for the second base station.

Turning now to FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a network 102 that provides service to current User Equipment (UE) 104 and 106 and one or more legacy UE 108 and 110. The network 102 may be accessible through a base station 112 that is connected to a backhaul server (not shown). The base station 112 and/or a computing device (e.g., whether local or remote) associated with the base station 112 may manage or otherwise control the operations of components of a cell site, including an antenna array 116. The base station 112 and/or the computing device associated with the base station 112 may include one or more processors and computer-readable storage media having computer-executable instructions or computer instruction modules embodied thereon for execution by one or more processors.

The antenna array 116 may radiate in a particular direction and, thus, may correspond to a particular sector of a cell site. The antenna array 116 may have a plurality of antenna elements, in embodiments. In one embodiment, the antenna array 116 is configured to have a plurality of elements that in number, arrangement, and/or density, are configured for mMIMO. In one such embodiment, the base station 112 may include a radio and/or a controller, such as a Massive Multiple-Input Multiple-Output Unit for controlling a mMIMO configured antenna array, such as the antenna array 116 having a plurality of antenna elements. The base station 112 may use the controller to monitor one or more of throughput, signal quality metrics (e.g., SINR), a quantity of unique users/subscribers, a quantity of unique UE(s), and/or remote location filings that occur at the base station, all of which may be monitored dynamically and/or as stored in a data store. The antenna array may also be configured to operate under a lower order number of antenna elements than the antenna array as configured to operate under a mMIMO configuration. Such a lower order configuration may be a legacy system such as an eight branch transmit and eight branch receive (8T8R) antenna structure.

The base station 112 may use a radio that is connected to the antenna array 116 by a physical RF path, where the radio is used to cause the antenna array 116 to transmit radio-frequency signals using the plurality of antenna elements. The plurality of antenna elements in the antenna array 116 may include portions of antenna elements (not shown). In embodiments, the plurality of antenna elements of the antenna array 116 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or, alternatively, "split" into equal halves, wherein each group or half operates to provide a coverage area for a distinct access technology when the antenna array 116 operates in a dual technology mode.

In some embodiments, the antenna array 116 is partitioned such that the first portion of antenna elements is associated with the first access technology and the second portion of antenna elements is associated with the second access technology. When the antenna array 116 is operating in a dual technology mode, each portion of the plurality of antenna elements may operate using only one distinct protocol and/or access technology relative to the other portions in the antenna array, in some embodiments. In one example, a first portion of antenna elements may operate using 5G wireless access technology and the second portion of antenna elements may operate using 4G wireless access technology. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

As such, the base station 112 may provide current UE 104 and 106 and legacy UE 108 and 110 with access to the network 102, in embodiments. In some embodiments, the first portion of antenna elements may communicate with current UE 104 and 106 using 5G technology, and the second portion of the antenna elements may communicate with legacy UE 108 and 110 using 4G technology. When operating in the dual technology mode, the antenna array 116 may concurrently connect to and communicate with the current UE 104 and 106 and legacy UE 108 and 110 using, respectively, at least two distinct access technologies.

Accordingly, in one example, when the antenna array 116 is operating in the dual technology mode, the base station 112 concurrently acts an eNodeB (or "eNB") and gNodeB (or "gNB"). As such, the base station 112 may provide service to one or more access technologies to both current and legacy UE. In addition to communicating with the current UE 104 and 106 and the legacy UE 108 and 110, the base station 112 may also communicate with one or more neighboring base stations. In some embodiments, the base station 112 may communicate with neighboring base station 120 using the first access technology and may communicate with another neighboring base station 122 using the second access technology. For example, because the base station 112 may operate concurrently as an eNodeB and a gNodeB using the antenna array 116 that is partitioned and operating in a dual technology mode, the base station 112 may communicate with other base station. For example, base station 112 communication may include legacy base stations that cannot use current access technologies (e.g., 5G) or current base stations that lack backward compatibility with prior access technologies (e.g., 4G). In embodiments, the base station 112 may bi-directionally exchange information with neighboring base stations 120 and 122 through an X2 interface or X2 link. Information regarding signal quality, RF conditions, one or more RLFs, and SINR levels at each of the neighboring base stations 120 and 122, and/or as reported from UE to the neighboring base stations 120 and 122 may be communicated to the base station 112 via the X2 link. Additionally or alternatively, information regarding signal quality, RLFs, and SINR levels at each of the neighboring base stations 120 and 122 may be communicated to the base station 112 over the backhaul.

As mentioned, the base station 112 may include a radio and/or a controller, such as an MMU, that enables the base station 112 to adjust or modify the operations and transmissions of the plurality of antenna elements in the antenna array 116. In embodiments, the operations, configurations, and/or settings of each antenna element may be individually controlled and adjusted by the base station 112 using the controller. In some embodiments, the operations, configurations, and/or settings of the first portion of antenna elements may be controlled and adjusted as a group by the base station 112 using a controller, such as an MMU, independent of the second portion of antenna elements. In a similar fashion, the operations, configurations, and/or settings of the second portion of antenna elements may be controlled and adjusted as a group by the base station 112 using the controller, independent of the first portion of antenna elements. Accordingly, the base station 112 may use a controller to independently adjust different groups or portions of antenna elements within one antenna array.

In embodiments, the operations, configurations, and/or settings of each individual antenna element may be adjusted and customized. For example, the base station 112 instructs a portion of antenna elements to transmit one or more synchronization signals using a periodicity. In another example, the portion of antenna elements may transmit a plurality of synchronization signals using the periodicity, as instructed by the base station 112. The synchronization signals may be specific to and/or configured for the first access technology, in embodiments.

Accordingly, the base station 112 may use a controller to independently adjust different individual antenna elements, any number of groupings and/or subset(s) of each portion of antenna elements, and/or portions of antenna elements within one antenna array. In embodiments, the base station 112 may use a controller to measure and monitor one or more of throughput, signal quality metrics (e.g., SINR), a quantity of unique users/subscribers, a quantity of unique UE, and/or RLFs.

Figure 2:
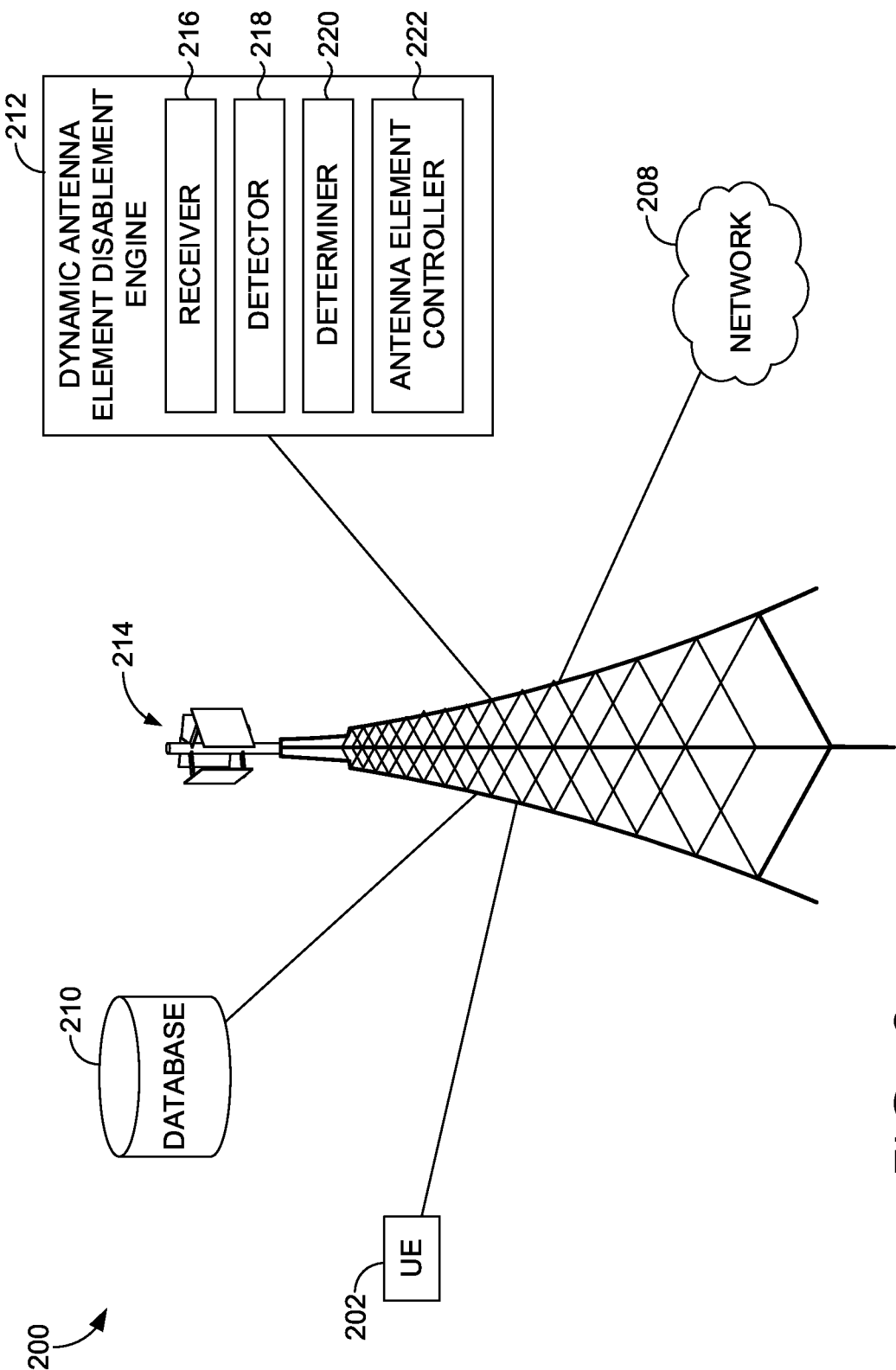
FIG. 2 depicts an exemplary telecommunications environment, in accordance with an embodiment of the present invention.

Turning now to FIG. 2, network environment 200 is an exemplary network environment in which implementations of the present disclosure may be employed. Network environment 200 is one example of a suitable network environment and is not intended to suggest any limitation as to the scope of use or functionality of the present disclosure. Neither should the network environment be interpreted as having any dependency or requirement relating to any one or combination of components illustrated.

Network environment 200 includes UE 202 (network environment 200 may contain more UEs), network 208, database 210, dynamic antenna element disablement engine 212, and cell site 214. In the network environment 200, UE 202 may take on a variety of forms, such as a PC, a user device, a smart phone, a smart watch, a laptop computer, a mobile phone, a mobile device, a tablet computer, a wearable computer, a PDA, a server, a CD player, an MP3 player, GPS device, a video player, a handheld communications device, a workstation, a router, an access point, and any combination of these delineated devices, or any other device that communicates via wireless communications with a cell site 214 in order to interact with network 208, which may be a public or a private network.

In some aspects, the UE 202 corresponds to a user device or a computing device. For example, the user device may include a display(s), a power source(s) (e.g., a battery), a data store(s), a speaker(s), memory, a buffer(s), a radio(s), and the like. In some implementations, the UE 202 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the UE 202 in network environment 200 may optionally utilize network 208 to communicate with other computing devices (e.g., a mobile device(s), a server (s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2 and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and/or data services to UE 202 and any other UEs. For example, network 208 may be associated with a telecommunications provider that provides services (e.g., LTE) to the UE 202. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the UE 202 that is located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the UE 202 when the UE 202 is geographically situated outside of the cell associated with the cell site 214.

In an exemplary aspect, the cell site 214 comprises a base station that serves at least one sector of the cell associated with the cell site 214 and at least one transmit antenna for propagating a signal from the base station to one or more of the UE 202. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more as measured at ground level and extending outward from an antenna at the cell site. In another example, a small cell may correspond to a coverage area having a radius of approximately less than three miles as measured at ground level and extending outward from an antenna at the cell site.

As shown, cell site 214 is in communication with the dynamic antenna element disablement engine 212, which comprises a receiver 216, a detector 218, a determiner 220, and a antenna element controller 222. The dynamic antenna element disablement engine 212 may connect UE 202 and other UEs to frequency bands within range of the UE 202 or other UEs for access to network 208. The dynamic antenna element disablement engine may also delay or prevent UE 202 connection to a frequency band for access to network 208. The dynamic antenna element disablement engine 212 may communicate with the database 210 for storing and retrieving data.

For example, the receiver 216 may retrieve data from the UE 202, the network 208, the database 210, and the cell site 214. In some embodiments, the receiver 216 may receive requests from UEs for access to a particular frequency band. Further, data the receiver 216 may access includes, but is not limited to, location information of the UE 202 and channel quality information. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example. Channel quality information may indicate the quality of communications between one or more user devices and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more user devices communicating with the cell site, observed SINR and/or signal strength at the user device(s), or throughput of the connection between the cell site and the user device(s). Location and channel quality information may take into account the UE's capability, such as the number of antennas of the user device and the type of receiver used by the user device for detection. The receiver 216 may also be configured to receive information from cell sites other than cell site 214 or other processors and/or servers.

Each sector corresponds to a radiation pattern of a corresponding antenna at the cell site. The shape, size, and dimension(s) of the service coverage area of the cell site are, generally, determined by an antenna's specific radiation pattern, as well as a direction, electrical tilt, mechanical tilt, installation height above the ground or surrounding geographic area, technical operating specifications, materials, obstructions (i.e., buildings, mountains, or other elevations), and power supplied to each of the first, second, and third antennas of the cell site, for example. The first, second, and third antennas wirelessly receive and transmit RF transmissions to and from, for example, user equipment, other antennas, other cell sites, base stations, and/or satellites, in order to facilitate communications between such devices, though not shown in FIG. 2 for clarity. In an embodiment, the first, second, and third antennas of the cell site capture two-way communications between the network and UE devices 202 that are within a geographic area corresponding to the service coverage area of the cell site.

Turning to detector 218, the detector 218 may detect UEs within a range, frequency bands, sector power ratios (SPRs) of frequency bands, SINRs, and loading factors (e.g., loading volume) corresponding to frequency bands, etc. Loading factors may change depending upon the day and time of day (e.g., world events such as natural disasters, terror attacks, pandemics, or religious holidays may prompt surges of UE traffic to or from specific locations), and may be stored in the database 210. Loading factors may include cell site 214 heat signature information, cell site 214 component performance information, channel quality information, or processor load measurements. Factors affecting the heat signature information of the cell site 214 include component model, component type, manufacturer, age of a component, wear and tear due to environmental factors, etc. Further, loading factors may also include an amount of current, backhaul traffic, or an anticipated current or backhaul traffic. Additionally, factors affecting loading volume may include a quantity of users connected to a frequency band or antenna properties at a time of receiving communication parameters from UEs connected to the frequency band. Other factors affecting loading volume may also include a capacity of the frequency band and data received from the quantity of users connected to the frequency band. The data received from the quantity of users may comprise a rate at which UEs are connected to and disconnected from the frequency band.

Detector 218 may also detect wireless communication protocols and wireless telecommunications networks associated with particular frequency bands. For example, the detector 218 may detect that a first wireless communication protocol of a first frequency band is a 5G wireless communication protocol and a second wireless communication protocol of a second frequency band is a 4G wireless communication protocol. Additionally, the detector 218 may detect a third wireless communication protocol of a third frequency band that comprises both a 5G and a 4G wireless communication protocol such that the network has an ability to maintain dual connectivity or a particular UE is able to connect to either 5G and 4G wireless communication protocols simultaneously.

Turning to determiner 220, the determiner 220 may determine that a UE is in a portion of a main lobe portion of a base station's beam, which is overlapped by a back lobe portion of a second base station's beam. For clarity, the power radiated in the opposite direction represents a back lobe of an antenna array. Determiner 220 may also determine, in response to a determination that the UE is present in a location experiencing back lobe overlap, that the particular UE has a reduction in performance due to interference from the overlapping lobes. This determination may be based on an evaluation of the signal quality, RF conditions, one or more RLFs, SINR levels, throughput, or any other channel conditions measured for that particular UE. Determiner 220 may determine, in response to overlapping lobes and reduced performance, that the UEs performance is reduced below a threshold value.

Lastly, antenna element controller 222, in response to the determination that the UE is in an area with an overlapping back lobe from a second base station and that performance is reduced below a threshold, may dynamically modify the number of elements utilized by the antenna array for the second base station. By modifying the number of elements within the second base station's antenna array, the gain from the second base station's back lobe may be reduced. Reducing the second base station's back lobe gain may thus reduce its overlap with the main lobe of the first base station's antenna array. Thus, the interference by the back lobe onto the main lobe of the first base station would be reduced.

Figure 3:
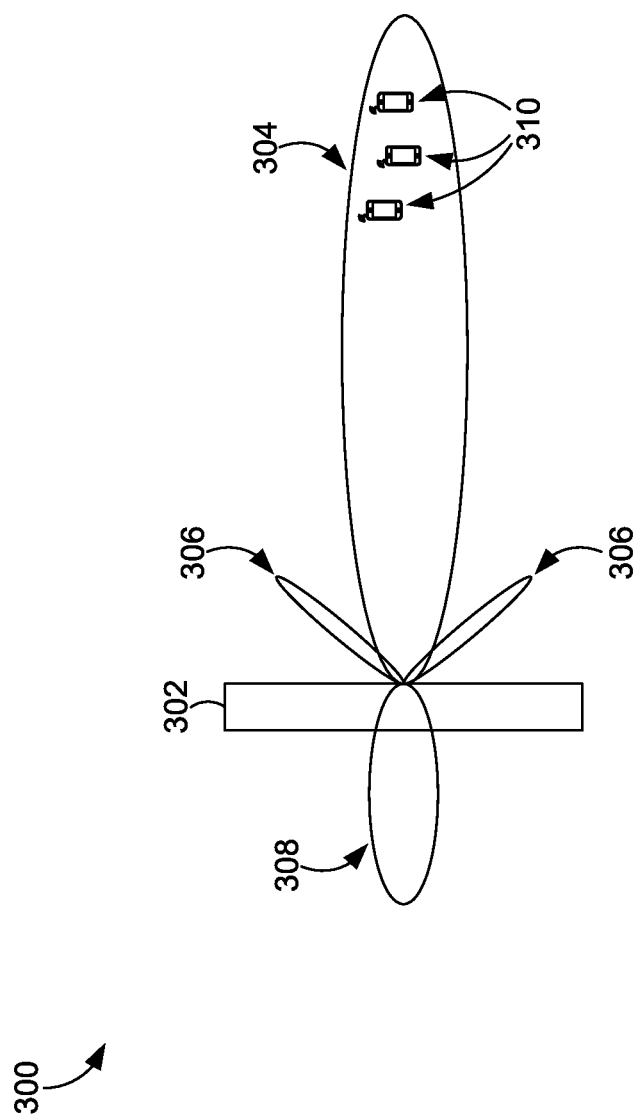
FIG. 3 depicts an exemplary schematic of the cell site, in accordance with an embodiment of the present invention.

Turning now to FIG. 3, exemplary multiple communication protocol environment 300 comprises base station 302, which may include a first antenna array; one or more antennas; a main lobe area 304 of a communication protocol, one or more side lobe areas 306 of a communication protocol, and a back lobe area 308 of a communication protocol. The location, shape and size of each of the three lobes is determined at least in part by the shape and size of the antenna array. In aspects, the one or more antennas may be dipole antennas, having a length, for example, of ¼, ½, 1, or 1½ wavelength. In aspects, the first antenna array may be an active antenna array, FD-MIMO, massive MIMO, 3G, 4G, 5G, and/or 802.11. While we refer to dipole antennas herein, in other aspects, the one or more antennas may be monopole, loop, parabolic, traveling-wave, aperture, yagi-uda, conical spiral, helical, conical, radomes, horn, and/or apertures, or any combination thereof. It is noted that adjusting one or more individual power supplies to the one or more antennas of the first antenna array may be applicable to an antenna array comprising any type of antenna targeting any portion of the RF spectrum (though any lower than VHF may be size prohibitive). In one aspect, the one or more antennas may be configured to communicate in the UHF and/or SHF spectrum, for example, in the range of 1.3 GHz-30 GHz.

By way of a non-limiting example, the first antenna array may comprise 64 antenna elements arranged in an 8×8 structure. In other aspects, the first antenna array may comprise antenna elements arranged in an 8×4, 4×8, or 4×4 configuration. Each antenna element of the first antenna array comprises a dedicated power supply having a certain phase and amplitude to a respective antenna element. In an aspect, the power supply comprises a power amplifier. In an aspect not depicted in the figures, the base station may further comprise a processor. The processor may be one or more of processors, servers, computer processing components, or the like. In some aspects, the processor may be communicatively coupled to each node and/or to each antenna of each node.

In certain aspects, the first antenna array may communicate or is capable of communicating with devices, using a 5G wireless communication protocol. While in this example 5G is mentioned as a wireless communication protocol, it should be understood that any wireless communication protocol standard may be utilized, for example, 3G, 4G, LTE, 5G, 802.11, or any other operator-elected wireless communication protocol standard. In the aspect, the first antenna array can include 64 antenna elements, each with a distinct direction which may be known, and where each antenna element is capable of communicating with one or more devices, e.g., using one or more specific beams, each identifiable as a beam index, as referred to herein, in aspects. In the same or alternative aspects, a device may communicate with more than one antenna element of the first antenna array. In aspects, using the methods and systems disclosed herein with a high-density antenna array, such as the first antenna array, and using a 5G wireless communication protocol as an example, can facilitate the strategic assignment of beam indices and/or allotment of beam indices tailored for a specific purpose or environment.

In some embodiments, the detector 218, in communication with the base station 302, may detect when a UE enters an area covered by one or more antenna elements of an antenna array, e.g., the first antenna array of the base station 302 of FIG. 3. In some embodiments, UEs may detect and/or measure one or more signals, e.g., synchronizations signals, from the antenna array when entering an area covered by the one or more antenna elements of the antenna array. As one example, UE 310 may have connection with the antenna array utilizing a first wireless communication protocol in the main lobe area 304. Additionally, the antenna array may detect that the UE 310 is communicating via a communication protocol using the main lobe 304 of the first base station 302.

By way of example, as depicted by FIG. 3, detector 218 may detect that the base station 302 has a main lobe 304, one or more side lobes 306, and a back lobe area 308. Detector 218 may also detect that one or more UEs may be communicating via a communication protocol using the main lobe 304 area of the first base station.

Figure 4:
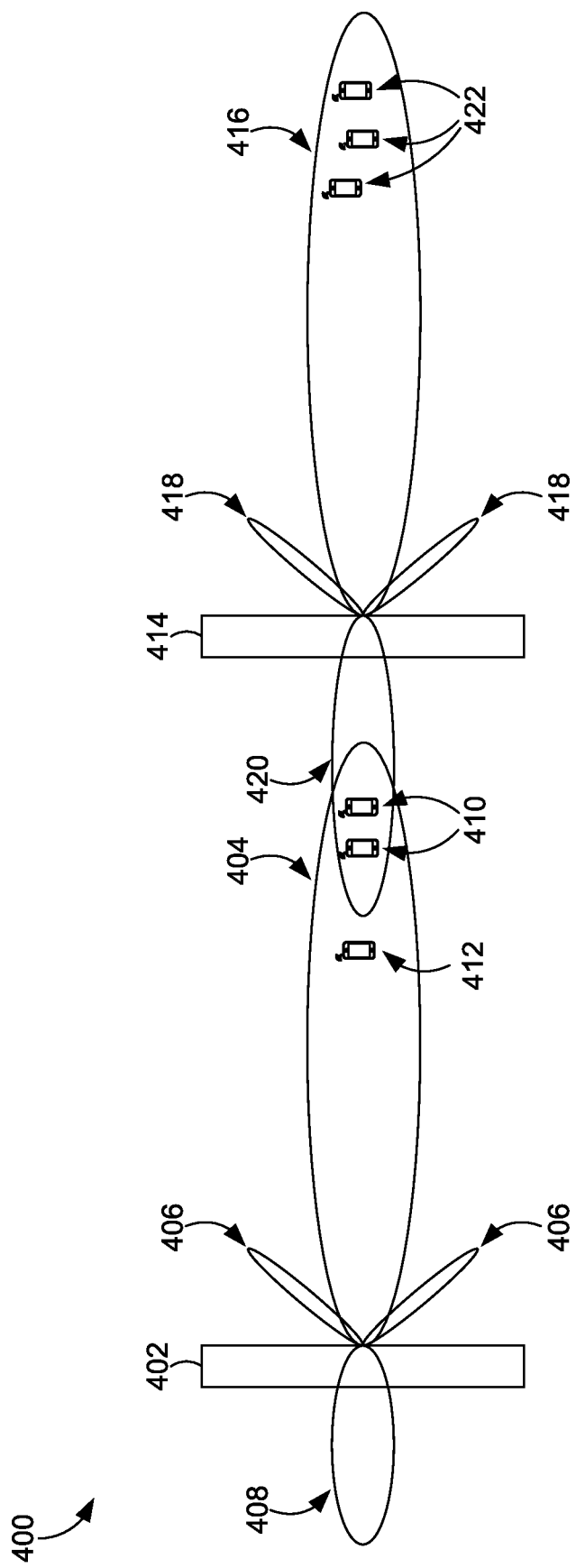
FIG. 4 depicts an exemplary schematic of the cell site, in accordance with an embodiment of the present invention.

Turning now to FIG. 4, exemplary multiple communication protocol environment 400 comprises a first base station 402 and a second base station 414. The first base station may include a first antenna array; one or more antennas; a main lobe area 404 of a communication protocol, one or more side lobe areas 406 of a communication protocol, and a back lobe area 408 of a communication protocol. The second base station 414 may include a first antenna array; one or more antennas; a main lobe area 416 of a communication protocol, one or more side lobe areas 418 of a communication protocol, and a back lobe area 420 of a communication protocol. The location, shape and size of each of the three lobes is determined at least in part by the shape and size of the antenna array. In aspects, the one or more antennas may be dipole antennas, having a length, for example, of ¼, ½, 1, or 1½ wavelength. In aspects, the first antenna array may be an active antenna array, FD-MIMO, massive MIMO, 3G, 4G, 5G, and/or 802.11. While we refer to dipole antennas herein, in other aspects, the one or more antennas may be monopole, loop, parabolic, traveling-wave, aperture, yagi-uda, conical spiral, helical, conical, radomes, horn, and/or apertures, or any combination thereof. It is noted that adjusting one or more individual power supplies to the one or more antennas of the first antenna array may be applicable to an antenna array comprising any type of antenna targeting any portion of the RF spectrum (though any lower than VHF may be size prohibitive). In one aspect, the one or more antennas may be configured to communicate in the UHF and/or SHF spectrum, for example, in the range of 1.3 GHz-30 GHz.

By way of a non-limiting example, the first antenna array may comprise 64 antenna elements arranged in an 8×8 structure. In other aspects, the first antenna array may comprise antenna elements arranged in an 8×4, 4×8, or 4×4 configuration. Each antenna element of the first antenna array comprises a dedicated power supply having a certain phase and amplitude to a respective antenna element. In an aspect, the power supply comprises a power amplifier. In an aspect not depicted in the figures, the base station may further comprise a processor. The processor may be one or more of processors, servers, computer processing components, or the like. In some aspects, the processor may be communicatively coupled to each node and/or to each antenna of each node.

In certain aspects, the first antenna array may communicate or is capable of communicating with devices, using a 5G wireless communication protocol. While in this example 5G is mentioned as a wireless communication protocol, it should be understood that any wireless communication protocol standard may be utilized, for example, 3G, 4G, LTE, 5G, 802.11, or any other operator-elected wireless communication protocol standard. In the aspect, the first antenna array can include 64 antenna elements, each with a distinct direction which may be known, and where each antenna element is capable of communicating with one or more devices, e.g., using one or more specific beams, each identifiable as a beam index, as referred to herein, in aspects. In the same or alternative aspects, a device may communicate with more than one antenna element of the first antenna array. In aspects, using the methods and systems disclosed herein with a high-density antenna array, such as the first antenna array, and using a 5G wireless communication protocol as an example, can facilitate the strategic assignment of beam indices and/or allotment of beam indices tailored for a specific purpose or environment.

In some embodiments, the detector 218, in communication with the first base station 402, and may detect when a UE enters an area covered by one or more antenna elements of an antenna array, e.g., the first antenna array of the first base station 402 or the second base station 414 of FIG. 4. In some embodiments, UEs may detect and/or measure one or more signals, e.g., synchronizations signals, from the antenna array when entering an area covered by the one or more antenna elements of the antenna array. As one example, UE 412 may have connection with the antenna array utilizing a first wireless communication protocol in the main lobe area 404. Additionally, the antenna array may detect that the UE 412 is communicating via a communication protocol using the main lobe 404 of the first base station 402.

In some embodiments, the detector 218, in communication with the second base station 414, and may detect when a UE enters an area covered by one or more antenna elements of an antenna array, e.g., the main lobe area 416 of the second base station 414 or the second base station 414 of FIG. 4. In some embodiments, UEs may detect and/or measure one or more signals, e.g., synchronizations signals, from the antenna array when entering an area covered by the one or more antenna elements of the antenna array. As one example, UE 412 may have connection with the antenna array utilizing a first wireless communication protocol in the main lobe area 416. Additionally, the antenna array may detect that the UE 422 is communicating via a communication protocol using the main lobe 416 of the first base station 414.

In some embodiments, the detector 218, in communication with the first base station 402, and may detect when a UE enters an area covered by one or more antenna elements of an antenna array, e.g., the first antenna array of the first base station 402 or the second base station 414 of FIG. 4. In some embodiments, UEs may detect and/or measure one or more signals, e.g., synchronizations signals, from the antenna array when entering an area covered by the one or more antenna elements of the antenna array. As one example, UE 412 may have connection with the antenna array utilizing a first wireless communication protocol in the main lobe area 404. Additionally, the antenna array may detect that the UE 410 is communicating via a communication protocol using the main lobe 404 of the first base station 402. Additionally, detector 218 may detect that the area of back lobe 420 is overlapping the area of the main lobe area 404.

Detector 218 may also detect that the UE 410, while connected to base station 402 by way of main lobe 404, is experiencing interference from the overlap of back lobe 420. Determiner 220 may also determine, in response to a determination that the UE 410 is present in a location experiencing back lobe overlap, that the particular UE has a reduction in performance due to interference from the overlapping lobes. This determination may be based on an evaluation of the signal quality, RF conditions, one or more RLFs, SINR levels, throughput, or any other channel conditions measured for that particular UE. Determiner 220 may determine, in response to overlapping lobes and reduced performance, that the UEs performance is reduced below a threshold value. Determiner 220 may also determine that the performance levels are currently below a threshold value. The threshold values for the performance values may be determined by a network administrator or automatically selected based on desired performance of the sector.

In embodiments, the first base station 402 may bi-directionally exchange information with the second base station 414 through a logical interface. Such a logical interface may be an X2 interface or X2 link. Information regarding signal quality, RF conditions, one or more performance metrics such as RLFs, and SINR levels at the first base station's main may be communicated to the second base station 414 via the X2 link or any logical interface. Additionally or alternatively, information regarding performance measures such as signal quality, RLFs, and SINR levels at the first base station 402 may be communicated to the second base station 414 over the backhaul.

Figure 5:
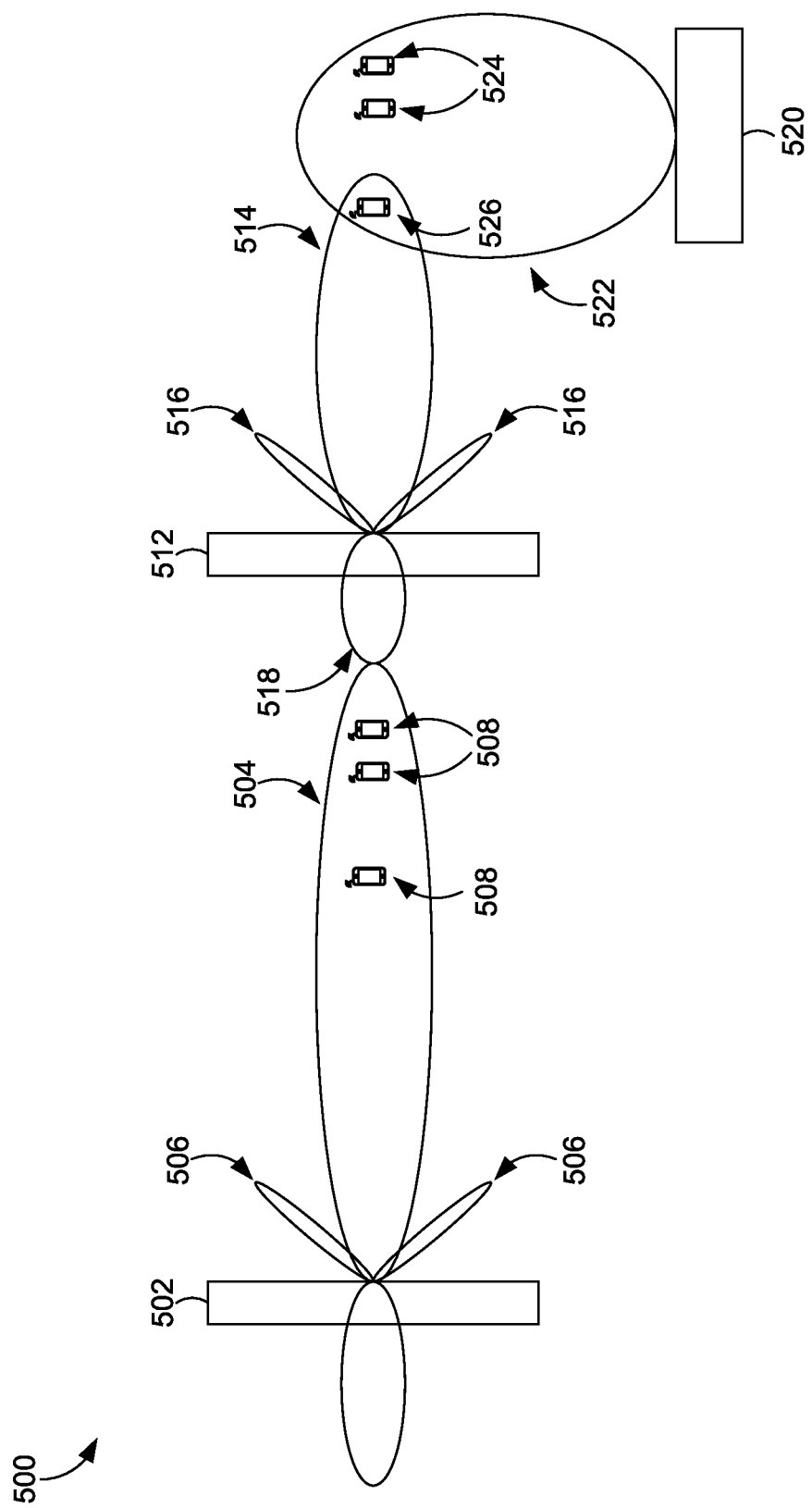
FIG. 5 depicts an exemplary schematic of the cell site, in accordance with an embodiment of the present invention.

Turning now to FIG. 5, exemplary multiple communication protocol environment 500 comprises a first base station 502, a second base station 512, and a third base station 520. The first base station may include a first antenna array; one or more antennas; a main lobe area 504 of a communication protocol, one or more side lobe areas 506 of a communication protocol, and a back lobe area 508 of a communication protocol. The second base station 512 may include a first antenna array; one or more antennas; a main lobe area 614 of a communication protocol, one or more side lobe areas 516 of a communication protocol, and a back lobe area 518 of a communication protocol. The third base station 520 may include a first antenna array; one or more antennas and a main lobe area 522.

In some embodiments, the detector 218, in communication with the first base station 502, second base station 512, or third base station 520, and may detect when a UE enters an area covered by one or more antenna elements of an antenna array, e.g., the first antenna array of the first base station 502, the second base station 514, or the third base station 520 of FIG. 5. As one example, UE 508 may have connection with the antenna array utilizing a first wireless communication protocol in the main lobe area 504. Additionally, the antenna array may detect that the UE 608 is communicating via a communication protocol using the main lobe 504 of the first base station 502.

As an example, in FIG. 5, in response to information communicated from the first base station 502 to the second base station 512 regarding the performance as described above. This communication contains information such that the second base station determines that the performance levels experienced with the main lobe 504 of the first base station is below a threshold value. In response to the determination that the communicated performance is below the threshold value, the second base station dynamically reduces the back lobe gain such that the back lobe 518 of the second base station 512 is no longer overlapping the main lobe 604. By reducing the gain of the back lobe 518, the UEs associated with the first base station 502 no longer experience interference from an overlap between the back lobe 518 and the main lobe 504. The second base station 512 may dynamically reduce the back lobe gain by reducing the number of elements used by the antenna array.

As an example, an antenna array may initially be broadcasting using 64 transmission elements. Upon determining that the received performance values from the first base station 502 is lower than a threshold value, the second base station 512 may then reduce the number of transmitting elements to 24, thus reducing the gain of both the back lobe 518 and the main lobe 514. As an example, UE 526 may have connection with the antenna array utilizing a first wireless communication protocol in the main lobe area 514. Additionally, the antenna array may detect that the UE 526 is communicating via a communication protocol using the main lobe 514 of the second base station 512. Further, UE 524 may have connection with the antenna array utilizing a first wireless communication protocol in the main lobe area 522. Additionally, the antenna array may detect that the UE 524 is communicating via a communication protocol using the main lobe 522 of the third base station 520, which may still be utilizing higher order antenna elements. As such, even with a reduction in gain in main lobe 514, UE 524 does not experience a drop in coverage due to multiple base stations within range. The second base station 512 may determine that the UEs associated with the second base station are able to be served by the third base station 520 prior to reducing gain of the main lobe 514.

In some embodiments, the first base station 502 continually monitors the performance levels and locations of UE 508 within the main lobe 504. The first base station 502 may determine that no UE is present within the area which may be overlapping by the back lobe of the second base station's antenna array when broadcasting using the full number of antenna elements. Such information may then be sent via a logical interface to the second base station 512. The second base station 512 may then determine that the performance measurements sent by the first base station 502 do not warrant a reduction in back lobe gain and may then dynamically increase the number of antenna elements utilized within the antenna array associated with the second base station 512.

Figure 6:
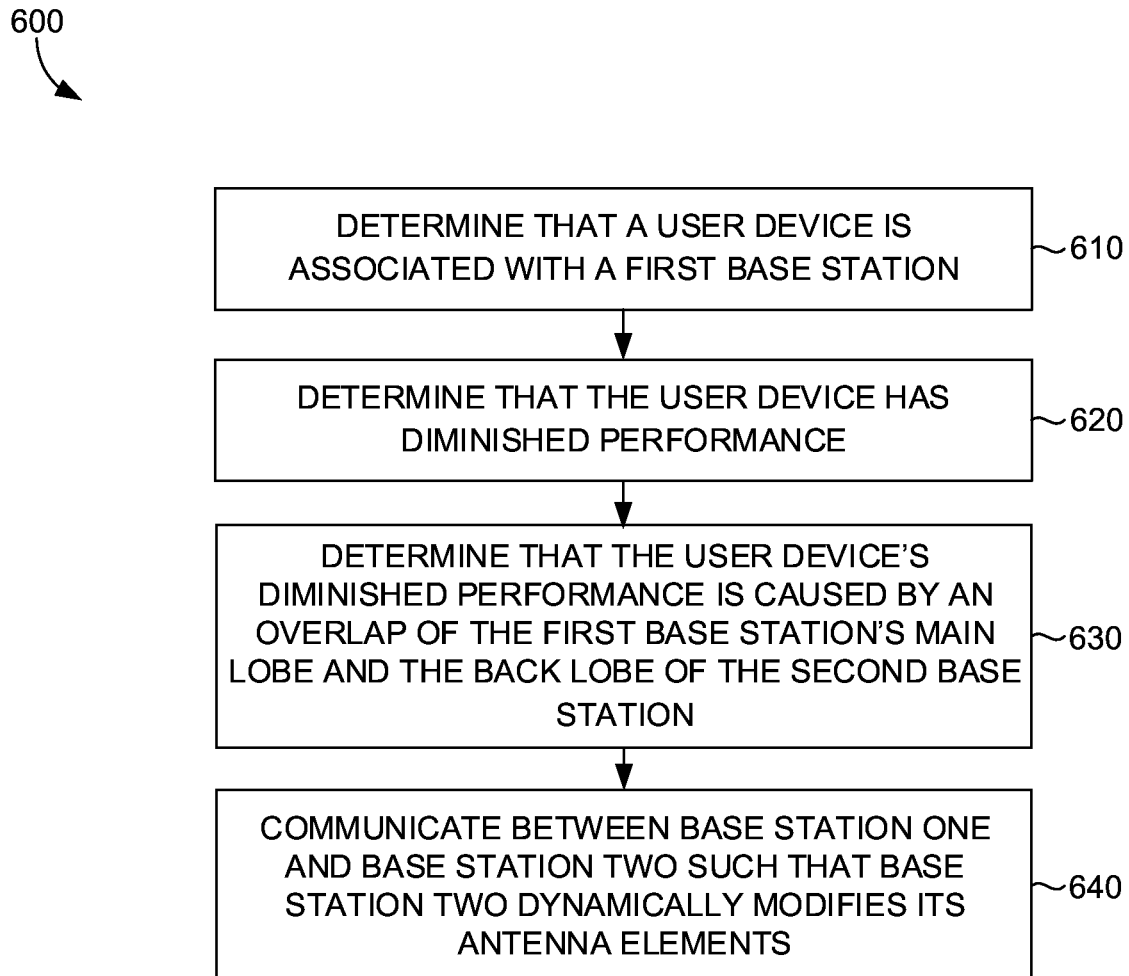
FIG. 6 depicts an exemplary method, in accordance with an embodiment of the present invention.

Turning now to FIG. 6, flow diagram 600 comprises an exemplary method dynamically modifying the antenna elements associated with an overlapping back lobe of a base station. Initially at block 610, it is determined that a first user device is associated with a first base station. At block 620, it is determined that the UE associated with the first base station has diminished performance, where the performance may be determined by analyzing the key performance indicators of the UE. At block 630, the location of the UE is determined to be in an area where the main lobe of the first base station and the back lobe of the second base station toverlap as to cause interference. At block 640, the first base station sends a communication to the second base station with instructions to dynamically modify the antenna array associated with the second base station. The second base station then dynamically modifies the antenna array associated with the second base station in order to reduce the back lobe gain and reduce the overlap between the back lobe of the second base station and the main lobe of the first base station.

Figure 7:
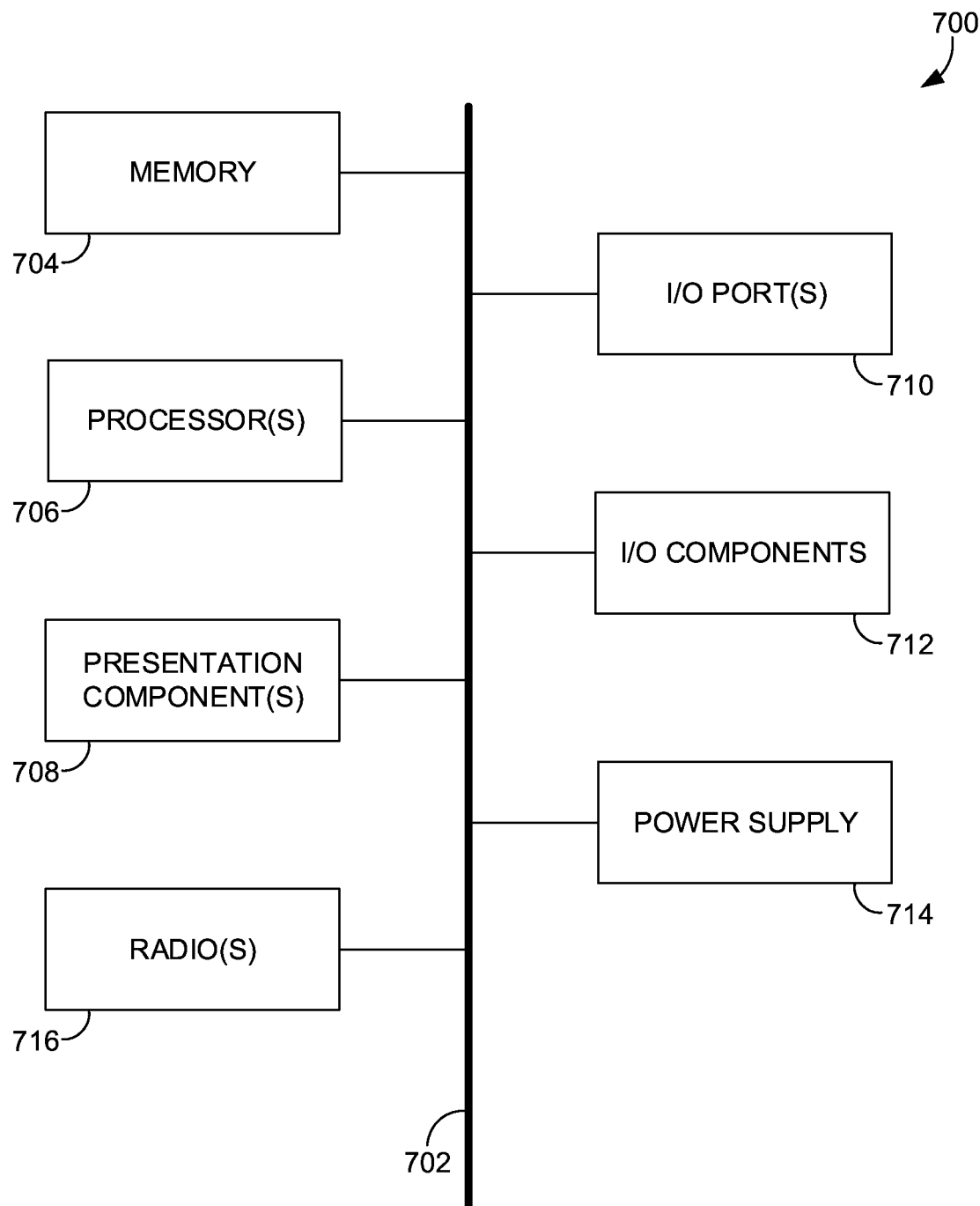
FIG. 7 depicts an exemplary computing device suitable for use in implementations of aspects herein.

Referring now to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 702 that directly or indirectly couples the following devices: memory 704, one or more processors 706, one or more presentation components 708, input/output (I/O) ports 710, I/O components 712, power supply 714 and radio(s) 716. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component, such as a display device to be one of I/O components 712. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 704 includes computer-storage media in the form of volatile and/or nonvolatile memory. Memory 704 may be removable, non-removable, or a combination thereof. Exemplary memory includes solid-state memory, hard drives, optical-disc drives, etc. Computing device 700 includes one or more processors 706 that read data from various entities, such as bus 702, memory 704, or I/O components 712. One or more presentation components 708 presents data indications to a person or other device. Exemplary one or more presentation components 708 include a display device, speaker, printing component, vibrating component, etc. I/O ports 710 allow computing device 700 to be logically coupled to other devices, including I/O components 712, some of which may be built in computing device 700. Illustrative I/O components 712 include a microphone, joystick, game pad, satellite dish, scanner, printer, wireless device, etc.

Radio 716 represents a radio that facilitates communication with a wireless telecommunications network. Illustrative wireless telecommunications technologies include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. One or more non-transitory computer-readable media having computer-executable instructions embodied thereon that, when executed, perform a method for managing a number of elements of an antenna array, the method comprising:
   determining that a first user device among a plurality of user devices is being served by a main lobe of a first antenna array, the first antenna array associated with a first base station;
   monitoring performance levels for the first user device;
   communicating the performance levels for the first user device to a second base station;

determining that the monitored performance levels for the first user device fall below a threshold value;

determining that the performance levels measured for the first user device are caused by an overlap of a first main lobe of the first antenna array and a back lobe of a second antenna array, the second antenna array being associated with the second base station; and based on the overlap determination, dynamically reducing the number of elements which are broadcasting on the second antenna array.

2. The media of claim 1, wherein
the number of elements is reduced from a first number of elements to a second number of elements.

3. The media of claim 2, wherein the first number of elements corresponds to a massive MIMO system.

4. The media of claim 3, wherein the second number of elements corresponds to a system with a lower order antenna elements.

5. The media of claim 4, wherein the system with the lower order antenna elements is an 8T8R system configuration.

6. The media of claim 1, wherein the performance levels are communicated from the first base station to the second base station using a logical interface.

7. The media of claim 6, wherein the logical interface is an X2 link.

8. The media of claim 7, wherein the performance levels that are monitored comprises SINK for the first user device.

9. A method for managing a number of elements of an antenna array, the method comprising:

determining that a first user device among a plurality of user devices is being served by a main lobe of a first antenna array, the first antenna array associated with a first base station;

monitoring performance levels for the first user device;

communicating the performance levels for the first user device to a second base station;

determining that the monitored performance levels for the first user device fall below a threshold value;

determining that the performance levels monitored for the first user device are caused by an overlap of a first main lobe of the first antenna array and a back lobe of a second antenna array, the second antenna array being associated with the second base station; and based on the overlap determination, dynamically reducing the number of elements which are broadcasting on the second antenna array.

10. The method of claim 9, wherein
the number of elements is reduced from a first number of elements to a second number of elements.

11. The method of claim 10, wherein the first number of elements corresponds to a massive MIMO system.

12. The method of claim 11, wherein the second number of elements corresponds to a system with a lower order antenna elements.

13. The method of claim 12, wherein the system with the lower order antenna elements is an 8T8R system configuration.

14. The method of claim 9, wherein the performance levels are communicated from the first base station to the second base station using a logical interface.

15. The method of claim 14, wherein the logical interface is an X2 link.

16. The method of claim 15, wherein the performance levels that are monitored is SINR for the first user device.

17. A system for managing a number of elements of an antenna array, the system comprising:

one or more processors; and computer storage media storing computer-readable instructions that, upon execution by the one or more processors, cause the one or more processors to perform operations comprising:

determining that a first user device among a plurality of user devices is being served by a main lobe of a first antenna array, the first antenna array associated with a first base station;

monitoring performance levels for the first user device;

communicating the performance levels for the first user device to a second base station;

determining that the monitored performance levels for the first user device fall below a threshold value;

determining that the performance levels monitored for the first user device are caused by an overlap of a first main lobe of the first antenna array and a back lobe of a second antenna array, the second antenna array being associated with the second base station; and based on the overlap determination, dynamically reducing the number of elements which are broadcasting on the second antenna array.

18. The system of claim 17, wherein the performance levels that are monitored is one or more channel conditions for the first user device.

19. The system of claim 17, wherein
the number of elements is reduced from a first number of elements to a second number of elements.

20. The system of claim 17, wherein the first number of elements corresponds to a massive MIMO system.

* * * * *